United States Patent
Tsirkin (10) Patent No.: US 9,672,173 B2
(45) Date of Patent: Jun. 6, 2017

(54) SHARED PCI INTERRUPT LINE MANAGEMENT

(71) Applicant: Red Hat Israel, Ltd., Ra'anana (IL)

(72) Inventor: Michael Tsirkin, Raanana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 280 days.

(21) Appl. No.: 14/632,577

(22) Filed: Feb. 26, 2015

(65) Prior Publication Data

US 2016/0253277 A1 Sep. 1, 2016

(51) Int. Cl.
G06F 13/00 (2006.01)
G06F 13/24 (2006.01)
G06F 13/40 (2006.01)
G06F 13/42 (2006.01)

(52) U.S. Cl.
CPC .......... *G06F 13/24* (2013.01); *G06F 13/4022* (2013.01); *G06F 13/4282* (2013.01); *G06F 2213/0024* (2013.01)

(58) Field of Classification Search
CPC .................. G06F 13/24; G06F 2213/0024
See application file for complete search history.

(56) References Cited

U.S. PATENT DOCUMENTS

| | | | |
|---|---|---|---|
| 6,397,284 B1 | 5/2002 | Sleeman et al. | |
| 6,604,161 B1 | 8/2003 | Miller | |
| 6,766,398 B2 | 7/2004 | Holm et al. | |
| 7,428,609 B2 | 9/2008 | Zmudzinski et al. | |
| 8,250,273 B2 | 8/2012 | Konireddygari et al. | |
| 8,504,754 B2 | 8/2013 | Craddock et al. | |
| 8,631,181 B2 | 1/2014 | Feehrer et al. | |
| 2002/0116563 A1* | 8/2002 | Lever | G06F 13/26 710/260 |
| 2004/0111549 A1* | 6/2004 | Connor | G06F 13/24 710/260 |
| 2005/0228921 A1 | 10/2005 | Sethi et al. | |
| 2006/0047877 A1* | 3/2006 | Winkler | G06F 13/24 710/260 |
| 2006/0259675 A1* | 11/2006 | Talluri | G06F 13/24 710/260 |
| 2013/0198432 A1 | 8/2013 | Ning et al. | |

OTHER PUBLICATIONS

"The Importance of Implementing APIC-Based Interrupt Subsystems on Uniprocessor PCs" http://blog.chinaunix.net/uid-26905859-id-4293510.html, Jan. 2003.

\* cited by examiner

*Primary Examiner* — Zachary K Huson
(74) *Attorney, Agent, or Firm* — Haynes and Boone, LLP (57) ABSTRACT

A method performed by a physical computing system includes, with the computing system, determining a set of devices that share a Peripheral Component Interconnect (PCI) interrupt line, with the computing system, disabling interrupt ability for each device within the set, with the computing system, selecting a first subset of devices within the set, with the computing system, enabling interrupt ability for each of the devices within the first subset, and with the computing system, in response to detecting an unhandled interrupt after enabling interrupt ability for the devices within the first subset, incrementing a counter for each device within the first subset.

20 Claims, 5 Drawing Sheets

SHARED PCI INTERRUPT LINE MANAGEMENT

BACKGROUND

The present disclosure relates generally to Peripheral Component Interconnect (PCI) devices, and more particularly to shared interrupt lines utilized by multiple PCI devices.

PCI is a local computer bus standard for attaching hardware devices in a computer. The PCI bus supports various functions found on a processor bus in a standardized format that is independent of a particular processor's native bus. PCI devices that are connected to the PCI bus are assigned addresses in the processor's address space.

When a PCI device needs attention from the processor, it sends an interrupt signal by asserting an interrupt line. The interrupt line stays asserted until the processor has handled the interrupt request of the PCI device. Specifically, the driver for the device will handle the interrupt request and then cause the interrupt line to be de-asserted after the interrupt request is appropriately handled.

In many cases, multiple PCI devices share the same interrupt line. Thus, when the interrupt line is asserted, the system must first determine what device is seeking attention. After handling that interrupt, the system can then check to see if the line is still asserted. It may be the case that another device on the same interrupt line is also seeking attention. When all interrupts have been handled, the interrupt line should then be de-asserted. It is desirable to manage the interrupts in an efficient manner.

SUMMARY

A method performed by a physical computing system includes, with the computing system, determining a set of devices that share a Peripheral Component Interconnect (PCI) interrupt line, with the computing system, disabling interrupt ability for each device within the set, with the computing system, selecting a first subset of devices within the set, with the computing system, enabling interrupt ability for each of the devices within the first subset, and with the computing system, in response to detecting an unhandled interrupt after enabling interrupt ability for the devices within the first subset, incrementing a counter for each device within the first subset.

A method performed by a physical computing system includes, with the computing system, determining a set of devices that share a Peripheral Component Interconnect (PCI) interrupt line, with the computing system, assigning a counter to each device within the set, with the computing system, disabling interrupt ability for each device within the set, with the computing system, periodically performing a function, the function comprising selecting a subset of devices within the set, enabling interrupt ability for devices within the first subset, and in response to detecting an unhandled interrupt after enabling interrupt ability for each of the devices within the first subset, incrementing the counter for each device within the first subset, and with the computing system, avoiding enabling interrupt ability for a device having a counter value within the counter for that device above a predefined threshold.

A computing system includes a processor, a set of Peripheral Component Interconnect (PCI) devices, an interrupt line configured for use by each of the PCI devices within the set to send an interrupt signal to the processor, a memory comprising machine readable instructions that when executed by the processor, cause the system to: disable interrupt ability for each device within the set, select a first subset of devices within the set, enable interrupt ability for devices within the first subset, and in response to detecting an unhandled interrupt after enabling interrupt ability for each of the devices within the first subset, increment a counter for each device within the first subset.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to manage the interrupts from an interrupt line shared by multiple PCI devices in an efficient manner. In some cases, one of the devices may be faulty or the driver for the device may have a bug that causes the interrupt line to be asserted even though there is no legitimate interrupt request that is to be handled. For example, a PCI device may send an interrupt request that the device driver does not know how to handle. Thus, the driver does not properly cause the device to de-assert the interrupt line. This can lead to a variety of problems as the operating system may keep attempting to process the unhandled interrupt.

According to principles described herein, when such a situation occurs, the system disables interrupts for each of the PCI devices on the shared interrupt line. This may be done, for example, by setting the interrupt disable bit in the PCI command register. Then, the system periodically executes the following function. First, the system selects a subset of the set of PCI devices that share the interrupt line. The system then enables interrupts for the PCI devices of that subset. This may be done, for example, by clearing the interrupt disable bit. If the unhandled interrupt is still present, then a counter is incremented for each device in the subset. For example, if each device in the subset previously had a counter value of zero, then each device would be incremented to a counter value of one. If, however, after enabling the interrupts for the subset of devices, it is determined that there is no longer an unhandled interrupt, then the devices within the subset can be removed from the set. This is because it is known that these devices are not causing the unhandled interrupt.

This function is repeatedly performed at set intervals of time. If, the counter value for a particular device passes a threshold value, then it can be assumed that such a device is likely the faulty device. Thus, the system can avoid enabling interrupts for this device. Eventually, all non-faulty devices will be re-enabled and the system can proceed as normal.

Figure 1:
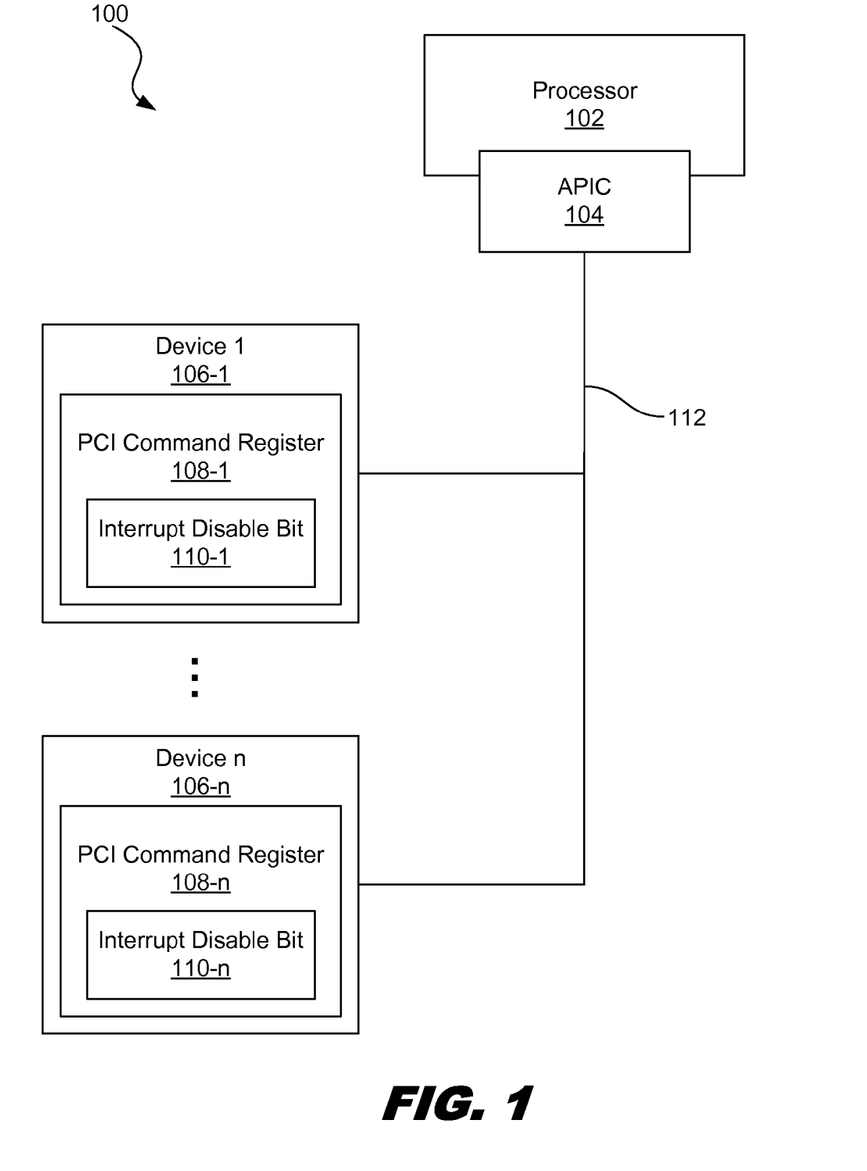
FIG. 1 is a diagram showing illustrative PCI devices sharing a single interrupt line, according to one example of principles described herein.

FIG. 1 is a diagram showing illustrative PCI devices 106 sharing a single interrupt line 112. According to the present example, a system includes a processor 102, an Advanced Programmable Interrupt Controller (APIC) 104, an interrupt line 112, and a set of PCI devices 106. Each PCI device 106 includes a PCI command register 108 with an interrupt disable bit 110-1.

The processor 102 may represent a single processor or a set of processors operating together. The processor 102 may be a physical processor or a virtual processor. The processor 102 fetches and executes a sequence of instructions. The instructions may represent code associated with an operating system, a device driver, or other applications associated with a computing system. As various PCI devices 106 of the computing system require attention, they can signal the processor by asserting the interrupt line 112. This will cause the processor to execute an interrupt handling routine.

Some systems utilize an APIC 104. An APIC 104 is a circuit that is used to handle interrupts from multiple devices. In some examples, the APIC 104 is a discrete circuit that is external to the processor 102 but works with the processor 102. In some examples, the APIC 104 is integrated with the processor 102.

The interrupt line 112 is shared by multiple PCI device 106. When a PCI device seeks attention from the processor 102, it notifies the processor by asserting the interrupt line 112. The interrupt line 112 may have a high digital signal to indicate a device 106 seeks attention and a low digital signal to indicate that no device seeks attention. The interrupt line 112 is designed so that the default state is the low digital signal. Thus, only when the line is actively asserted by one of the PCI device 106 will it have a high signal that indicates a device 106 is seeking attention.

The PCI devices 106 may be any piece of hardware that utilizes the PCI bus standard. For example, a PCI device may be a network adapter or a video adapter. Some computing systems may have multiple network adapters. In the case of virtual systems, the PCI devices 106 may be virtual network adapters.

A PCI device includes a PCI command register as part of the PCI configuration space. The PCI configuration space is a set of registers that are mapped to memory address locations. One of the registers within the set of registers is the command register 108. The command register is a bitmask of features that can be individually enabled and disabled. One such feature is the interrupt disable feature.

The interrupt disable bit 110 within the command register corresponds to the interrupt disable feature and indicates whether interrupts are disabled. For example, a '0' may indicate that interrupts are not disabled. To disable interrupts, the interrupt disable bit 110 is set to "1". To enable interrupts, the interrupt disable bit 110 is cleared to '0'. Each PCI device 106 has its own PCI command register 108 and interrupt disable bit 110. Thus, Device 1 106-1 has a corresponding PCI command register 108-1 and interrupt disable bit 110-1 Likewise, Device n 106-n has a corresponding PCI command register 108-n and interrupt disable bit 110-n.

Figure 2:
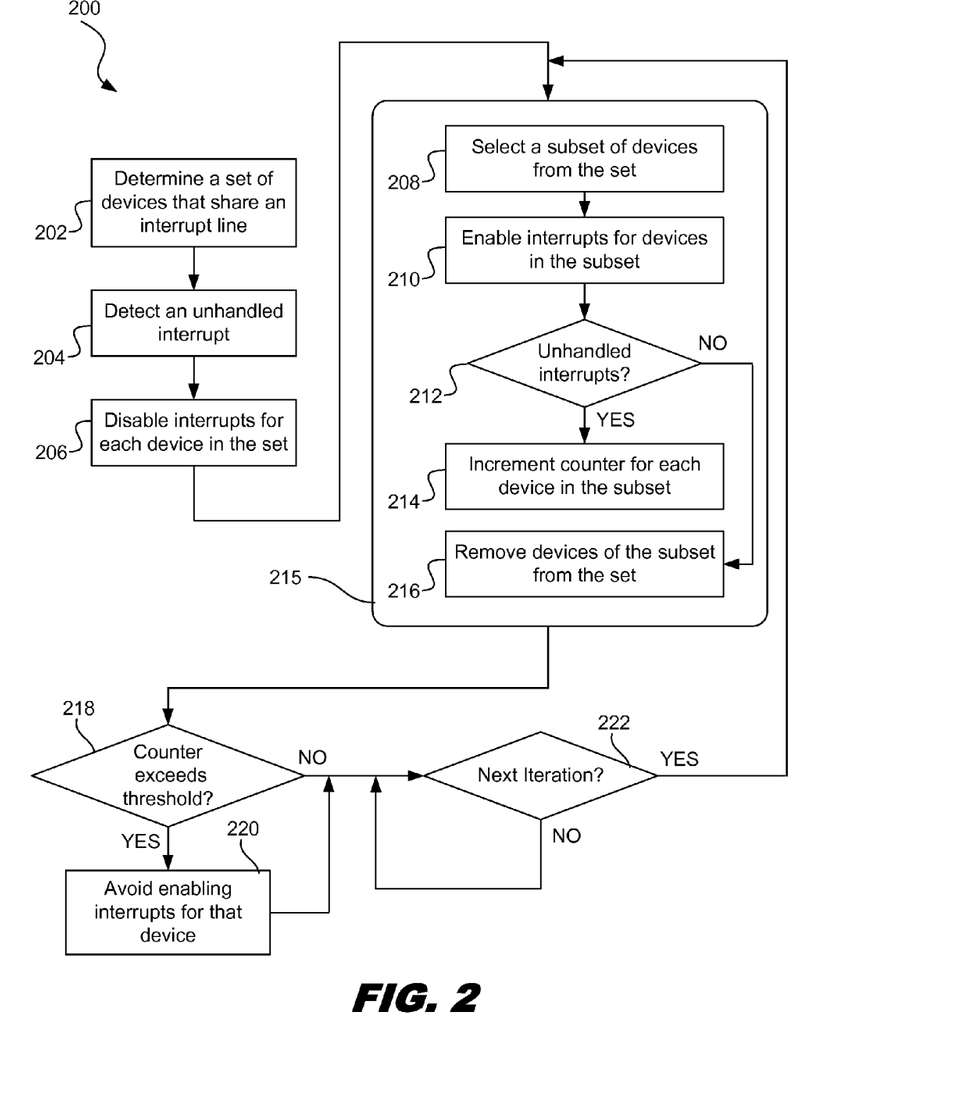
FIG. 2 is a flowchart showing an illustrative method for managing interrupts for PCI devices sharing an interrupt line, according to one example of principles described herein.

FIG. 2 is a flowchart showing an illustrative method for managing interrupts for PCI devices sharing an interrupt line. According to the present example, the method 200 includes a step for determining a set of devices that share an interrupt line 202. This information may be readily available through standard mechanisms.

The method 200 further includes a step 204 for detecting an unhandled interrupt. Specifically, it is determined that the interrupt line (e.g. 112, FIG. 1) is being asserted, yet there does not appear to be any device within the set of devices that needs attention. Typically, when the interrupt line is asserted, one of the devices has an interrupt request that is handled by the driver for that device. After handling that interrupt, the interrupt line is then de-asserted. But, as described above, it may be the case that due to a driver bug or device fault, the interrupt line remains asserted, and there is no legitimate interrupt device that has to be handled. Moreover, there is no mechanism to determine which of the devices sharing the interrupt line is causing the issue.

The method 200 further includes a step 206 for disabling interrupts for each device in the set 206. In other words, the interrupt ability, or ability to send interrupt signals, is disabled. This may be done, for example, by setting the interrupt disable bit in the PCI command register for each of the devices. In some cases, however, a particular faulty device may not respond to an instruction to disable interrupts by setting the interrupt disable bit. In such a case, the shared interrupt line can be disabled through the APIC (e.g. 104). For example, if after attempting to disable interrupts by setting the interrupt bit accordingly for each device on the shared interrupt line, it may be determined that an unhandled interrupt is still being asserted. Because the interrupt ability for the faulty device cannot be disabled using the interrupt disable bit, the shared interrupt line can be deactivated through the APIC.

In one example, the interrupt ability may be disabled in each of the devices within the set simultaneously. In some examples, however, the interrupt ability may be disabled successively at set periods of time. In other words, one of the interrupt ability for one of the devices is disabled, and then after a set period of time, the interrupt ability for another device is disabled. This continues until all devices within the set have disabled interrupt ability.

Then, the method 200 further includes periodically executing a function 215. Specifically, at predetermined time intervals, the following function is executed. The function 215 includes a step 208 for selecting a subset of devices from the set. The subset of devices may be selected randomly. Alternatively, the subset of devices may be selected in turn.

The function 215 further includes a step 210 for enabling interrupts for devices in the subset. Thus, the interrupt ability, or ability to send interrupt signals, is enabled. This may be done, for example, by clearing the interrupt disable bits (e.g. 110, FIG. 1) for each of the devices within the set. In some examples, the APIC may be used to enable interrupts for those devices.

At step 212, it is determined whether there are unhandled interrupts. In other words, if the issue that was detected in step 204 occurs again, then it is likely that one of the devices within the subset is responsible for the unhandled interrupt that is causing the interrupt line to be asserted. If the unhandled interrupt is detected, then the method proceeds to step 214. Otherwise, if the unhandled interrupt is not detected, then the method proceeds to step 216.

At step 214, a counter for each device within the subset is incremented. Specifically, a counter is created for each device within the set of PCI devices. Thus, each counter is associated with a unique device within the set. The counters may be stored in main memory of the system that is using the currently described process. Before the first iteration of the function, the counter for each device may be initialized to zero. Use of the counter will be described in further detail below. Additionally, interrupts for each of the devices within the subset is again disabled.

At step 216, if it is determined that no unhandled interrupt is detected then each device within the subset is removed from the set. This is because it can be presumed that none of these devices are responsible for the unhandled interrupt that was detected in step 204. Thus, during subsequent iterations of the function 215, when selecting a subset from the set of devices, none of the devices that were removed will be within the new subset. Moreover, the interrupts for the devices within the subset remain enabled.

The steps 208-216 of the function will be performed periodically. As multiple iterations are executed, the set of devices will become smaller as devices known not to be causing the unhandled interrupt are removed. Moreover, the counter for the device that is actually causing the problem will continue to rise because any time that device is included within a subset, it will have its counter be incremented at step 214.

The method 200 further includes a step 218 for determining if the counter for any of the devices within the set exceeds a predetermined threshold. If a counter for a device does in fact exceed the threshold, then the system avoids enabling interrupts for that device in step 220. For example, if the threshold is three, and the counter for a PCI device reaches four, then the system decides that it will not enable interrupts for that device. This is because it is likely that that device is causing the unhandled interrupt.

The method 200 may be applied to physical systems and the physical PCI devices of that system. In some examples, however, the method may be applied to a virtual machine. For example, a host system may run present a virtual machine to a guest operating system. The virtual machine may include a virtual processor with a virtual interrupt line shared by a set of virtual PCI devices.

The method 200 further includes a step 222 for determining whether it is time for the next iteration. In other words, if the predetermined time interval at which the function is to be executed has elapsed, then the method 200 proceeds to execute the next iteration of the function 215. If there are no devices left within the set, except for a device that has its associated counter beyond the predetermined threshold, then the system may stop executing the function 215.

Figure 3A:
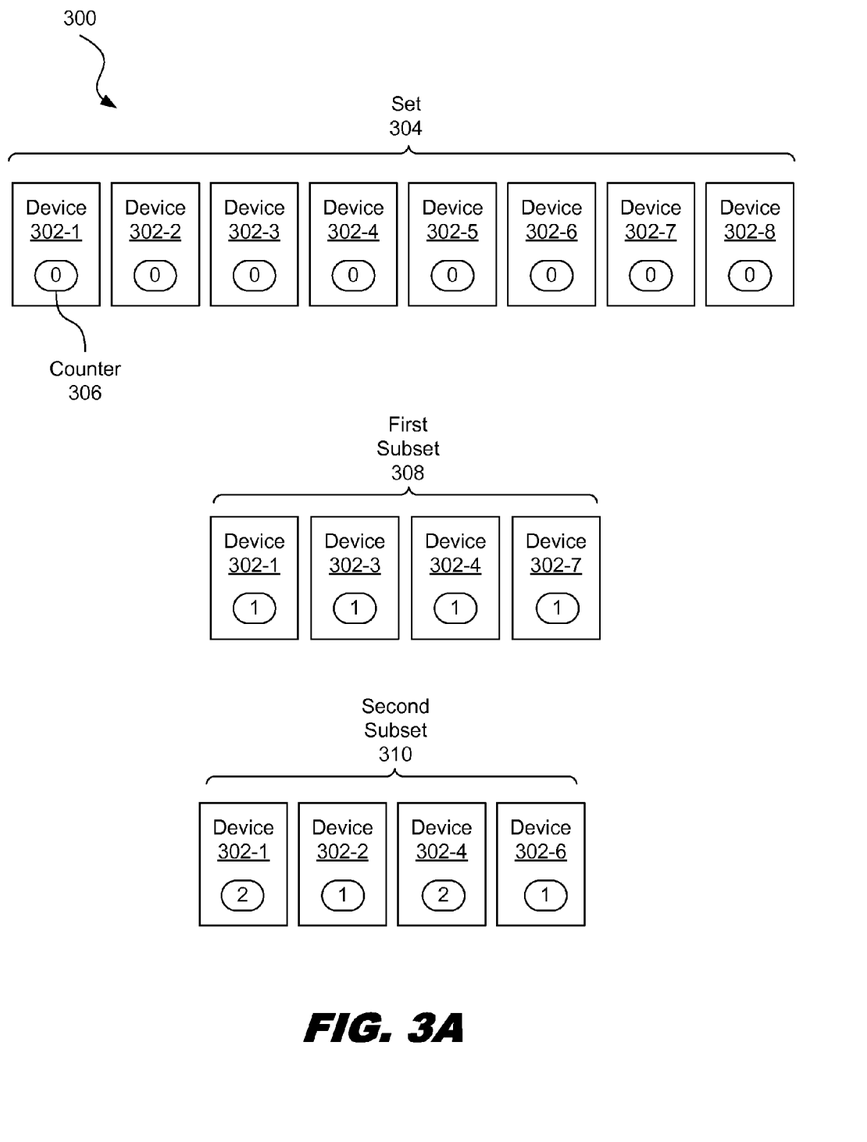
FIGS. 3A-3B are diagrams showing illustrative subsets of a set of devices that share an interrupt line, according to one example of principles described herein.
Figure 3B:
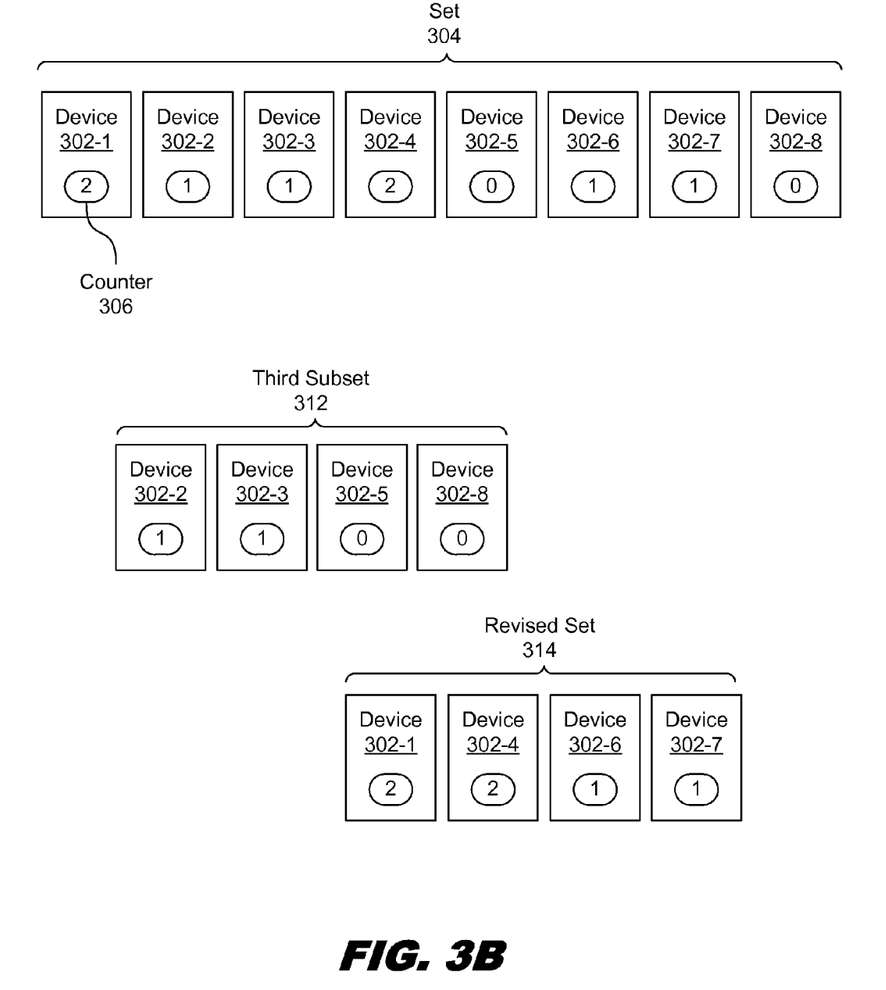

FIGS. 3A-3B are diagrams showing illustrative subsets of a set 304 of devices 302 that share an interrupt line. FIG. 3A illustrates an original set 304 of devices and two illustrative subsets 308, 310. According to the present example, a set 304 of devices includes eight PCI devices, labeled 302-1 to 302-8. Each device has a counter 306 associated with it. The counters 306 are initialized to zero.

As described above, during an iteration of the function (e.g. 215, FIG. 2), a subset of devices is selected. The first subset 308 includes, for example, Device 302-1, Device 302-3, Device 302-4, and Device 302-7. In the present example, it is determined during a first iteration that selects the subset 308 that the unhandled interrupt is present when enabling interrupts. Thus, the counter for each device is incremented and interrupts for those devices are again disabled.

During a second iteration of the function, a second subset 310 is selected. The second subset 310 includes Device 302-1, Device 302-2, Device 302-4 and Device 302-6. Again, it is determined that enabling interrupts for the devices of the second subset 310 causes the unhandled interrupt. Thus, the counter is incremented for each of the devices within the subset 310.

In the present example, subsets are selected randomly. Thus, it is possible that there is overlap of devices between successive iterations. For example, Device 302-1 and Device 302-4 are in both the first subset 308 and the second subset 310. In some examples, however, subsets may be selected in a round robin manner. For example, subsequent iterations of the function would select subsets in turn so that within a set number of iterations, each device within the set will be within a group exactly once. In one such example, a first iteration includes Device 302-1 and Device 302-2, a second iteration includes Device 302-3 and Device 302-4, a third iteration includes Device 302-5 and 302-6, and a fourth iteration includes Device 302-7 and Device 302-8. Thus, there is no overlap between subsequent iterations. A subset may be any number of the total devices within the set. For example, a selected subset may include only one device. In some examples, a selected subset may include all devices within the set 304.

FIG. 3B illustrates another subset 312, and a revised set 314. According to the present example, a third subset is selected during a third iteration of the function. The third subset 312 includes Device 302-2, Device 302-3, Device 302-5, and Device 302-8. In the present example, it is determined that enabling interrupts for each of the devices within the subset 312 does not cause an unhandled interrupt. Thus, each of the devices within the third subset 312 can be removed from the set 304. That is because it can be assumed that such devices are not causing the unhandled interrupt issue. These devices are removed even though they have a non-zero counter.

The revised set 314 indicates the set of devices after the devices of the third subset 312 have been removed. Subsequent iterations of the function will thus select a subset of the revised set 314. After a number of iterations, it may be the case that the revised set is narrowed down to one device. Thus, the counter for the last remaining device will likely continue to increment until it exceeds the threshold.

Figure 4:
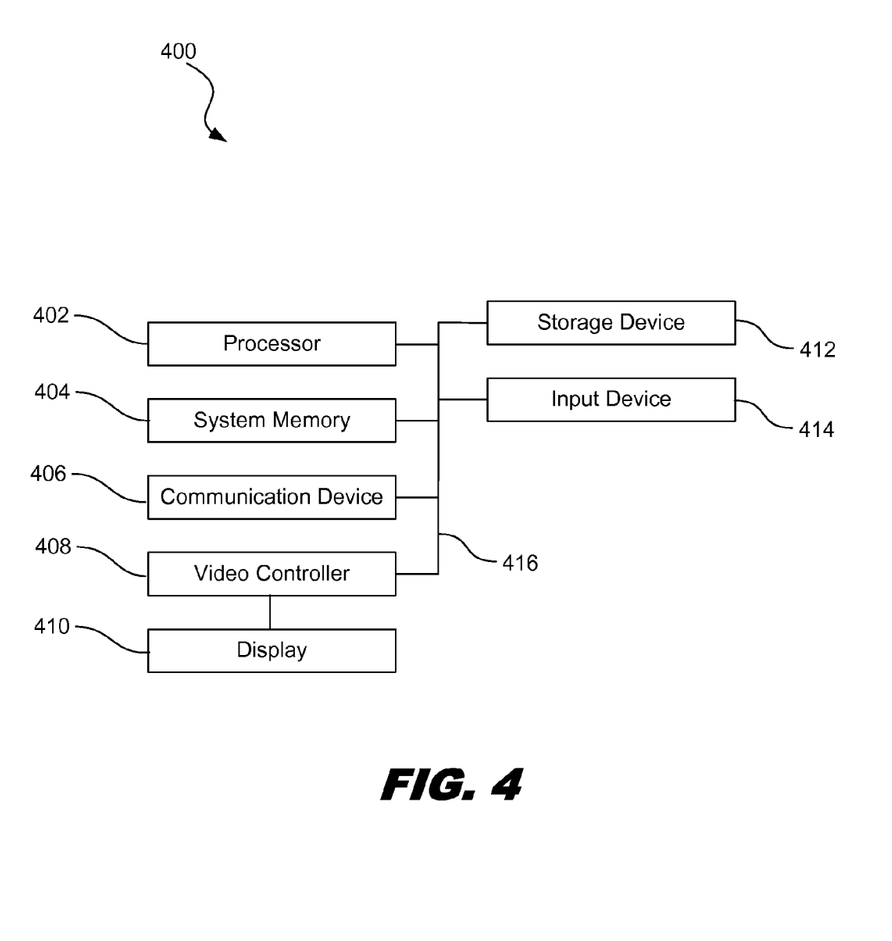
FIG. 4 is a diagram of an illustrative computing system that includes multiple PCI devices that share an interrupt line, according to one example of principles described herein.

FIG. 4 is a diagram of an illustrative computing system that includes multiple PCI devices that share an interrupt line. For example, the computing system 400 may include components of a server system that implements the method 200 described above.

According to the present example, the computing system 400 includes a processor 402, an input device 414, a storage device 412, a video controller 408, a system memory 404, a display 410, and a communication device 406, all of which are interconnected by one or more buses 416.

The storage device 412 may include a computer readable medium that can store data. The storage device 412 may include volatile memory storage devices such as Random Access Memory (RAM) as well as non-volatile memory storage devices such as solid state memory components. The computer readable medium may be a non-transitory tangible media.

In some examples, the communication device 406 may include a modem, network card, or any other device to enable the computing system 400 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 400 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 404, and/or any combination thereof, may be executed by a processor 402 to cause the processor 402 to carry out or implement in whole or in part the operation of the computing system 400, one or more of the methods. In some examples, such a processor 402 may execute the plurality of instructions in connection with a virtual computer system.

Some examples of processing systems described herein may include non-transitory, tangible, machine readable media that include executable code that when run by one or more processors (e.g., processor 402) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   with the computing system, determining a set of devices that share a Peripheral Component Interconnect (PCI) interrupt line;
   with the computing system, disabling interrupt ability for each device within the set;
   with the computing system, selecting a first subset of devices within the set;
   with the computing system, enabling interrupt ability for each of the devices within the first subset; and
   with the computing system, in response to detecting an unhandled interrupt after enabling interrupt ability for the devices within the first subset, incrementing a counter for each device within the first subset.

2. The method of claim 1, further comprising, avoiding enabling interrupt ability for a device having a counter value above a predefined threshold.

3. The method of claim 1, further comprising, in response to determining that enabling interrupt ability for each of the devices within the subset does not cause the unhandled interrupt, removing the devices within the first subset from the set.

4. The method of claim 1, wherein disabling interrupt ability for a device comprises setting an interrupt disable bit of a PCI command register of that device.

5. The method of claim 1, further comprising, in response to detecting an unhandled interrupt after disabling interrupt ability for each device within the set, disabling the shared PCI interrupt line through an Advanced Programmable Interrupt Control (APIC) associated with the shared PCI interrupt line.

6. The method of claim 1, wherein enabling interrupt ability for a device comprises clearing an interrupt disable bit of a PCI command register of that device.

7. The method of claim 1, wherein disabling interrupt ability for each device within the set is done by disabling interrupts successively at set periods of time.

8. The method of claim 1, wherein the first subset is selected randomly.

9. The method of claim 1, further comprising:
with the computing system, selecting a second subset of devices within the set;
with the computing system, enabling interrupt ability for devices within the second subset; and
with the computing system, in response to determining that enabling interrupt ability for each of the devices within the second subset causes an unhandled interrupt, incrementing a counter for each device within the second subset.

10. The method of claim 9, wherein the first subset and the second subset are selected in a round robin manner.

11. A method performed by a physical computing system, the method comprising:
with the computing system, determining a set of devices that share a Peripheral Component Interconnect (PCI) interrupt line;
with the computing system, assigning a counter to each device within the set;
with the computing system, disabling interrupt ability for each device within the set;
with the computing system, periodically performing a function, the function comprising:
selecting a subset of devices within the set;
enabling interrupt ability for devices within the first subset; and
in response to detecting an unhandled interrupt after enabling interrupt ability for each of the devices within the first subset, incrementing the counter for each device within the first subset; and
with the computing system, avoiding enabling interrupt ability for a device having a counter value within the counter for that device above a predefined threshold.

12. The method of claim 11, further comprising, in response to determining that enabling interrupt ability for each of the devices within the subset does not cause an unhandled interrupt, removing the devices within the subset from the set.

13. The method of claim 11, wherein disabling interrupt ability for a device comprises setting an interrupt disable bit of a PCI command register of that device.

14. The method of claim 11, further comprising, in response to detecting an unhandled interrupt after disabling interrupt ability for each device within the set, disabling the shared PCI interrupt line through an Advanced Programmable Interrupt Control (APIC) associated with the shared PCI interrupt line.

15. The method of claim 11, wherein enabling interrupt ability for a device comprises clearing an interrupt disable bit of a PCI command register of that device.

16. The method of claim 11, wherein the first subset is selected randomly.

17. The method of claim 11, wherein each a series of periods in which the function is performed selects non-overlapping subsets such that each device within the set is selected within the series.

18. A computing system comprising:
a processor;
a set of Peripheral Component Interconnect (PCI) devices;
an interrupt line configured for use by each of the PCI devices within the set to send an interrupt signal to the processor;
a memory comprising machine readable instructions that when executed by the processor, cause the system to:
disable interrupt ability for each device within the set;
select a first subset of devices within the set;
enable interrupt ability for devices within the first subset; and
in response to detecting an unhandled interrupt after enabling interrupt ability for each of the devices within the first subset, increment a counter for each device within the first subset.

19. The system of claim 18, wherein the machine readable instructions further cause the processor to avoid enabling interrupt ability for a device having a counter value above a predefined threshold.

20. The system of claim 18, wherein the machine readable instructions further cause the processor to, in response to determining that enabling interrupt ability for each of the devices within the subset does not cause an unhandled interrupt, remove the devices within the subset from the set.

* * * * *